Sept. 10, 1940.　　　J. KRIEGER　　　2,214,619
MIXING VALVE FAUCET
Filed Nov. 17, 1938
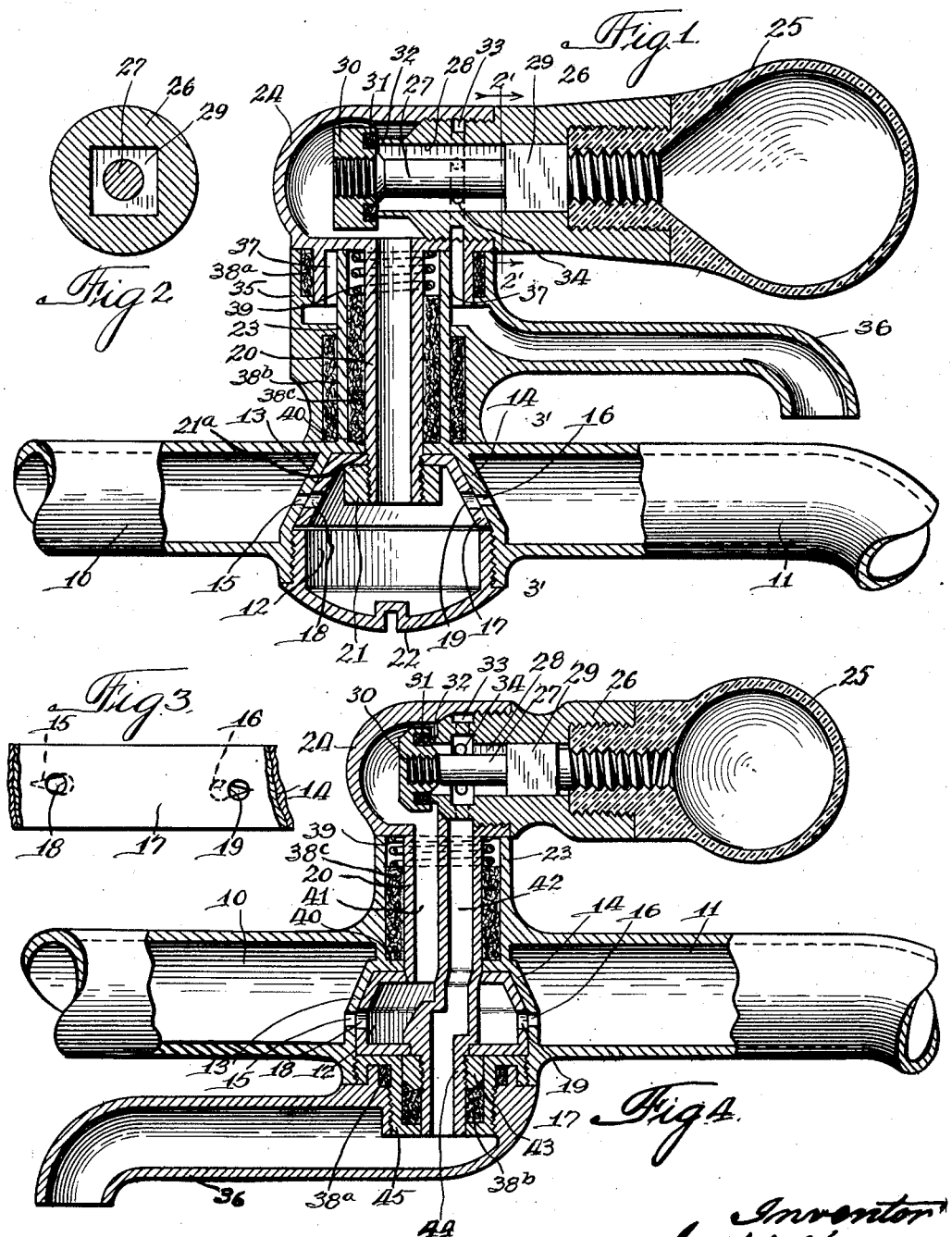

Patented Sept. 10, 1940

2,214,619

UNITED STATES PATENT OFFICE 2,214,619

MIXING VALVE FAUCET

Joseph Krieger, Chicago, Ill.

Application November 17, 1938, Serial No. 240,911

11 Claims. (Cl. 277—18)

This invention relates to a mixing valve faucet.

One of the objects of the invention is the provision of improved means for mixing a plurality of separate streams of fluids and discharging the mixture from a suitable spout.

A further object of this invention is to provide a means for mixing fluids in any desired proportions and for further controlling the total amount of mixed fluid delivered into a spout in a new and novel manner.

Further and additional objects will appear from the following description, the accompanying drawing, and the appended claims.

Referring to the drawing,

Fig. 1 is a sectional view of a mixing faucet constructed in accordance with one embodiment of this invention;

Fig. 2 is a section taken along the line 2'—2' of Fig. 1;

Fig. 3 is an exploded view of the inside periphery of the mixing chamber shown in Fig. 1; and Fig. 4 is a sectional view of a modified form of mixing faucet constructed in accordance with this invention.

The mixing faucet contemplated by this invention comprises a plurality of conduits, capable of conducting the fluids to be mixed, terminating in a common mixing chamber. The flow of the fluid from each conduit may be regulated by a rotary plug valve which permits simultaneous introduction of fluid from each conduit into the mixing chamber. The ports in the plug valve may be so shaped that the amount of fluid entering from one conduit may be increased while that entering from another conduit is decreased. The plug valve may be turned on an axis that is substantially perpendicular to the axis of the conduits leading to the mixing chamber through the plug valve. A passageway extends from the mixing chamber into a housing, within which may be positioned another valve which may regulate the quantity of fluid flowing from the mixing chamber. The second mentioned valve is movable along a line perpendicular to the axis of rotation of the plug valve and the same handle may be employed for the operation of both valves. In order to regulate the proportion of fluids mixed, the handle and the attached housing may be rotated in one plane and, in order to control the volume of mixed fluid flowing from the faucet, the same handle may be rotated separately from the housing in a plane perpendicular to the first mentioned plane of rotation.

In accordance with this invention, a mixing valve has been produced which is particularly useful for proportioning water from hot and cold water pipes in order to obtain a flow of the temperature desired. Furthermore, the volume of flow of the mixed fluid is directly adjustable by a separate means. It will, of course, be recognized that the device may be employed likewise for the mixture of different chemicals and, with suitable modifications may be employed for the proportioning of streams of gases.

For a more complete understanding of this invention, reference will now be had more specifically to Fig. 1. The ends of a pair of conduits 10 and 11 are integrally cast in one piece and each terminates in a mixing chamber 12. Partitions 13 and 14 are positioned in the ends of the conduits 10 and 11, respectively, which may contain the teardrop-shaped ports 15 and 16, as indicated in Fig. 3. A plug valve is positioned within the mixing chamber which comprises a cone-shaped member 17 having round ports 18 and 19 adapted to register with ports 15 and 16 in the partitions 13 and 14. The conical-shaped member 17 is securely fastened to a hollow valve stem 20 by means of a suitable bushing 21 which extends into the mixing chamber 12. The bushing 21 forces the edges of the conical-shaped member 17 against the shoulders 21a positioned on the lower portion of the hollow valve stem 20. A plug 22 is threadably engaged to the partitions and side walls of conduits 10 and 11 in order to permit access to the interior of the mixing chamber 12 and the bushing 21.

A cylindrical member 23, which is integral with the conduits 10 and 11, extends vertically from the juncture of the conduits and surrounds the hollow valve stem 20. The hollow valve stem 20 terminates in a housing 24 and is integral therewith. A valve assembly is threadably engaged with the housing 24 perpendicular to the axis of the valve stem 20. This valve assembly comprises a handle 25 which is threadably engaged with a tubular member 26, which latter carries a valve and slidable valve stem 27. The valve handle 25 may also be threadably engaged with the valve stem 27. The hole 28 extending through the tubular member 26, through which the valve stem passes, is preferably noncircular in cross section, such as a square, as indicated in Fig. 2. One end portion 29 of the valve stem 27 is fitted to the hole 28 so that the valve stem 27 is slidably mounted within the hole 28, but will not turn therein. Consequently, when the handle 25 is turned on the threads adjacent the tubular member 26, the valve stem 27 is forced either to the right or the left, because of the threadable engagement of the valve stem 28 with the handle 25. The threads on the valve stem may be reversed and have a high pitch so that the valve stem may be moved a comparatively long distance to the right or left for a small displacement of the handle 25 from the tubular member. The end of the valve stem 27 extending into the housing 24 has positioned thereon a suitable bushing 30 which may have a cylindrical gasket material 31 positioned therein adapted to engage the valve seats 32 positioned at the end of the tubular member 26.

An annular groove 33 may be provided around the outside of tubular member 26 adjacent the threads by which the tubular member 26 is engaged with the housing 24. When the tubular member 26 is engaged with the housing, a hollow passageway is thereby provided around the circumference of the tubular member. Suitable holes 34 may be provided connecting the hole 28 in the tubular member with the annular passageway 33.

The housing member 24, the upper valve assembly, and the hollow valve stem 20 are rotatably mounted on the cylindrical member 23, which is integral with the conduits 10 and 11. It is also mounted on a bearing and housing member 35, which totally surrounds the cylindrical member 23 and is also capable of rotation in a plane parallel to the plane of rotation of the housing and upper valve assembly. The housing 35 has a spout 36 attached integrally with it. Also, a passageway 37 is provided between the juncture of the housing 35, the housing 24, and the cylindrical member 33. The passageway 37 extends around the outside periphery of the upper portion of the cylindrical member 23 and is positioned to connect directly with the annular passageway 33, which is positioned around the tubular member 26. It will thus be observed that, for any amount of rotation of the handle 25 and the upper valve assembly or rotation of the spout 36 and the housing 24 around the hollow valve stem 20, there will at all times be maintained a passageway from the hole 28 in the tubular member 26, through the holes 34, through the annular passageway 33, through the passageway 37, to the spout 36.

Suitable gaskets 38a, b, and c, may be provided at desired positions in order to maintain a tight closure. The spring 39 is provided which bears down on the gasket 38c, positioned around the hollow valve stem 20, against the shoulder 40 at the ends of the conduits 10 and 11. This pressure causes the conical portion 17 of the plug valve to be lifted and seated tightly against the side walls of the mixing chamber 12.

In order to disassemble the structure shown in Fig. 1, it is only necessary to remove the plug 22 from the mixing chamber 12 and unscrew the bushing 21 from the hollow valve stem 20. The housing 24 and the upper valve assembly may be then readily lifted off. Likewise, the housing and spout may also be slipped off over the cylindrical member 23.

In operation, the proportion of liquids entering from each conduit 10 and 11 into the mixing chamber 12 may be regulated by rotating the tap handle 25 and the housing 24 in the plane parallel to the axis of the conduits 10 and 11. The relative positions of the registering ports 15 and 18, and 16 and 19, in the partitions 13 and 14 and the conical member 17 may be readily changed thereby. Due to the relative shapes and positions of the various holes, different sized openings from the conduits 10 and 11 into the mixing chamber may be readily produced. The construction is such that, in either extreme position of the housing 24, both ports 15 and 16 will be closed. The construction and relative positions of the ports are indicated in an exploded view in Fig. 3. The round ports 18 and 19, positioned in the cone-shaped member 17, and the teardrop ports 15 and 16, positioned in the partitions 13 and 14, register to provide varying sized passageways extending from the conduits 10 and 11 to the mixing chamber 12. When the relative position of the cone 17 is far to the right, none of the ports register and no fluid passes into the mixing chamber. When the cone is moved to the left, port 18 registers with the large portion of port 15 before port 19 registers with the small portion of port 16. A full stream from conduit 10 is thereby directed into the mixing chamber 12. As the cone 17 is moved further to the left, a small amount of fluid becomes admitted to the chamber through the small passageway formed by ports 16 and 19. At the same time the volume of fluid entering the chamber through ports 15 and 18 is correspondingly decreased, whereby the total volume of fluid introduced into the chamber remains substantially constant. Further movement of the cone to the right results in an increase in flow of fluid into the chamber from conduit 11 and a corresponding decrease in flow from conduit 10. Finally, the flow from conduit 10 is entirely shut off when that from conduit 11 is turned on full force. Further movement to the left also closes the passageway from conduit 11.

The mixed fluid flows from the mixing chamber through the hollow valve stem 20 into the housing 24, where further flow is controlled by the valve regulated by the handle 25. When the handle 25 is twisted in the proper direction on the threads joining the tubular member 26, the valve stem is caused to move to the left, as has been previously described, whereby the valve is unseated from the seats 32. The mixture of fluid may then flow in any desired quantities directly into the hole 28 of the tubular member 26, through the holes 34 to the annular passageway 33, and to the passageway 37 and out of the spout 36.

In accordance with this invention, the mixing faucet may also be constructed in accordance with the modification shown in Fig. 4. This modification is similar to the structure shown in Fig. 1 except that the spout may be attached directly to the mixing chamber and conduits below the mixing chamber. In this modification, the conduits 10 and 11 come together in a mixing chamber 12 in the same manner that has been previously described. The hollow valve stem 20 that is integral with the housing 24, however, comprises two passageways 41 and 42, the former leading from the mixing chamber to the upper valve assembly and the latter leading from the upper valve assembly directly to the spout 36. The conical member 17 is firmly clamped to a tubular member 44 by means of a bushing 43, said tubular member being integral with the hollow valve stem 20 and comprising the lower portion of the passageway 42 extending from the upper valve assembly. The conical member 17 of the plug valve is thereby lifted and held in place by means of the spring 39 bearing down on the packing material 38c against the shoulder 40.

In order to secure a spout 36 adjacent the tubular member 44 which is capable of independent horizontal movement, a suitable bushing 45 may be provided which is threadably engaged to the lower portion of the mixing chamber 12 and fits over the bushing 43 and between which may be secured suitable gasket material 38b. A spout 36 may then be threadably engaged to the bushing 45, and gasket material 38a may be positioned therebetween so that the spout may be free to rotate on the threads about the axis of the bushing without danger of leakage.

The mode of operation of the construction shown in Fig. 4 is substantially the same as that shown in Figs. 1 to 3. The modified form may be disassembled by unscrewing the spout 36 from the bushing 45 and subsequently unscrewing the bushing 45 from the lower portion of the mixing chamber 12. The bushing 43 may then be removed from the tubular member 44 and the whole upper valve assembly may be lifted directly out of the upper portion of the mixing chamber 12. It will be noted that the conical member 17 of the plug valve in the modification is not integral with the hollow valve stem 20 and is held tightly against it by means of the bushing 43.

It will be observed from the above description that a valve has been produced suitable for mixing fluids in any desired proportions and delivering them in any desired quantities through a single spout. Its mode of operation is simple, since only one handle or control means is necessary. In accordance with the construction shown in the foregoing, the plug valve may be turned to the "off" position and a gasket may be readily replaced in the upper valve assembly merely by unscrewing the tubular member 26 from the housing 24. Consequently it is not necessary to interrupt the line service or to provide extra faucets for use when it is necessary to make such changes or repairs.

While two particular embodiments of this invention are shown above, it will be understood, of course, that the invention is not to be limited thereto, since many modifications may be made, and it is contemplated, therefore, to cover any such modifications as fall within the true spirit and scope of this invention as defined by the appended claims.

I claim:

1. A mixing valve and faucet comprising a valve casing having two fluid supply connections, a rotary valve for controlling the proportion of the supply from the two connections, a rotatable stem for actuating said valve, said stem having a passage through which the mixed fluid flows, a lever secured to said stem for actuating it, a second valve carried by said lever and movable with respect to said stem for controlling the flow through said passage, and means carried by said lever for actuating said second valve.

2. A mixing valve and faucet comprising a valve casing having two fluid supply connections, a rotary valve for controlling the proportion of the supply from the two connections, a rotatable stem for actuating said valve, said stem having a passage through which the mixed fluid flows, a lever secured to said stem for actuating it, a second valve carried by said lever for controlling the flow through said passage, and means carried by said lever for actuating said second valve comprising a handle rotatable about an axis transverse the axis of said valve stem.

3. A mixing valve and faucet comprising a valve casing having two fluid supply connections, a rotary valve for controlling the proportion of the supply from the two connections, a rotatable stem for actuating said valve, said stem having a passage through which the mixed fluid flows, a lever secured to said stem for actuating it, a second valve carried by said lever and movable with respect to said stem for controlling the flow through said passage, and means carried by said lever for actuating said second valve, said rotatable stem having a second passage leading from the discharge side of said second valve through said stem.

4. A mixing and flow regulating valve of the character described comprising a mixing chamber, a plurality of fluid supply conduits for said mixing chamber, a valve means for controlling the volume rate of flow from said conduits to said mixing chamber, a rotatable stem for actuating said valve means, a lever carried by said stem, a second valve positioned within said lever and movable with respect to said stem, a fluid discharge means, a passageway extending from said mixing chamber through said second mentioned valve means to said fluid discharge means, and means carried by said lever for actuating said second mentioned valve whereby the rate of flow of fluid through said passageway is regulated.

5. A mixing valve comprising a mixing chamber, a pair of fluid supply conduits terminating in said chamber, a valve for controlling the proportion of fluid supply from the two conduits, a rotatable stem for actuating said valve extending from said mixing chamber, said stem having a passage through which the mixed fluid flows, a lever secured to said stem for actuating it, a second valve carried by said lever for controlling the flow through said passage, a housing enclosing said stem positioned between said lever and said mixing chamber carrying a spout and providing a passageway from said second mentioned valve to said spout, said housing and spout being rotatably mounted on an axis coincident to the axis of said valve stem, and a means carried by said lever for actuating said second mentioned valve.

6. A mixing valve comprising a mixing chamber, a pair of fluid supply conduits terminating in said chamber, a valve for controlling the proportion of fluid supply from the two conduits, a rotatable stem for actuating said valve extending from said mixing chamber, said stem having a passage through which the mixed fluid flows, a lever secured to said stem for actuating it, a second valve carried by said lever and movable with respect to said stem for controlling the flow through said passage, a spout, and a second passage extending through said stem and through said mixing chamber communicating said second valve and said spout, said spout being rotatably secured to said mixing chamber.

7. A mixing valve and faucet comprising a valve casing having two fluid supply connections, a rotary valve for controlling the proportion and amount of the supply from the two connections, a rotatable stem for actuating said valve, said stem having a passage through which the mixed fluid flows, a lever secured to said stem for actuating it, a detachable second valve carried by said lever for controlling the flow through said passage, means for detaching said second valve when said rotary valve is in the "off" position, and means carried by said lever for actuating said second valve.

8. A combined mixing valve and volume valve construction comprising a casing having two sources of liquid supply, a mixing valve and valve seat for variably controlling the proportion supplied from two sources and for stopping the flow from both sources, a volume valve and valve seat for controlling the volume and stopping the flow of mixed fluids, and actuating means including means common to both valves for moving either valve with respect to its seat without moving the other valve with respect to its seat, said volume controlling valve and valve seat being removable for inspection and repair while the mixing valve is in position for stopping the flow from both sources.

9. A combined mixing valve and volume valve construction comprising a casing having two sources of liquid supply, a mixing valve and valve seat for variably controlling the proportion supplied from two sources and for stopping the flow from both sources, a volume valve and valve seat for controlling the volume and stopping the flow of mixed fluids, and actuating means including means common to both valves for moving either valve with respect to its seat without moving the other valve with respect to its seat, said mixing valve being rotatable about an axis and said volume controlling valve being movable transversely of the axis of said mixing valve, said volume-controlling valve and valve seat being removable for inspection and repair while the mixing valve is in position for stopping the flow from both sources.

10. A combined mixing valve and volume valve construction comprising a casing having two sources of liquid supply, a mixing valve and valve seat for variably controlling the proportion supplied from two sources and for stopping the flow from both sources, a volume valve and valve seat for controlling the volume and stopping the flow of mixed fluids, and actuating means including means common to both valves for moving either valve with respect to its seat without moving the other valve with respect to its seat, said mixing valve being rotatable, said common means comprising a handle member rotatable about the axis of the mixing valve and rotatable about a different axis for actuating the volume valve, said volume valve being movable longitudinally of said different axis, said volume-controlling valve and valve seat being removable for inspection and repair while the mixing valve is in position for stopping the flow from both sources.

11. A combined mixing valve and volume valve construction comprising a casing having two sources of liquid supply, a mixing valve and valve seat for variably controlling the proportion supplied from two sources and for stopping the flow from both sources, a volume valve and valve seat for controlling the volume and stopping the flow of mixed fluids, and actuating means including means common to both valves for moving either valve with respect to its seat without moving the other valve with respect to its seat, said mixing valve being rotatable about an axis and said volume controlling valve being movable transversely of the axis of said mixing valve, said volume controlling valve being located above said mixing valve, said volume-controlling valve and valve seat being removable for inspection and repair while the mixing valve is in position for stopping the flow from both sources.

JOSEPH KRIEGER.